W. DE HUFF.
STUFFING BOX.
APPLICATION FILED APR. 23, 1912.

1,032,995.

Patented July 16, 1912.

Witnesses:
Wills A Burrows
William T. Nase

Inventor:
Walter De Huff
by his Attorneys
Howson & Howson

UNITED STATES PATENT OFFICE.

WALTER DE HUFF, OF YORK, PENNSYLVANIA, ASSIGNOR TO THE READ MACHINERY COMPANY, INC., OF YORK, PENNSYLVANIA, A CORPORATION OF PENNSYLVANIA.

STUFFING-BOX.

1,032,995.      Specification of Letters Patent.      Patented July 16, 1912.

Application filed April 23, 1912. Serial No. 692,686.

*To all whom it may concern:*

Be it known that I, WALTER DE HUFF, a citizen of the United States, residing in York, Pennsylvania, have invented certain Improvements in Stuffing-Boxes, of which the following is a specification.

One object of this invention is to provide a novel construction of stuffing box primarily designed to prevent leakage of liquid from a container along a rotating shaft at the point where said shaft enters such container; the arrangement of parts being such that the device shall properly perform its function even though the shaft should wear or loosely fit at its bearing or at its point of passage through the container wall.

A further object of the invention is to provide a stuffing box with a novel form of adjustable floating packing gland which shall follow the shaft to which it is applied, as this wears or changes its position in its bearings and thereby maintain a tight joint between the shaft and the structure through which it passes.

Figure 1:
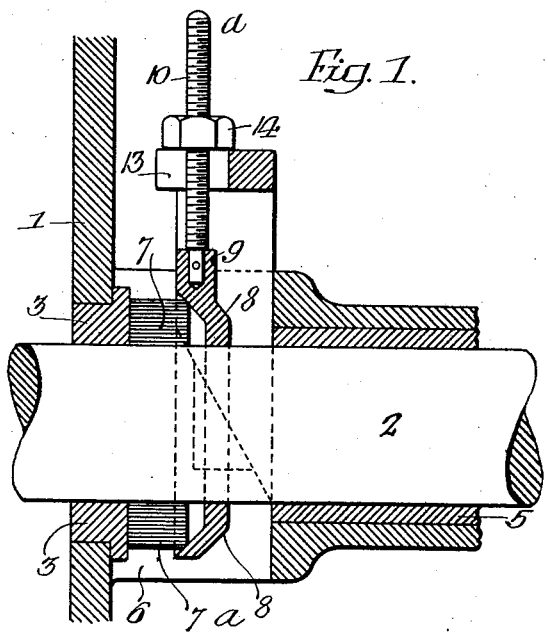
Figure 2:
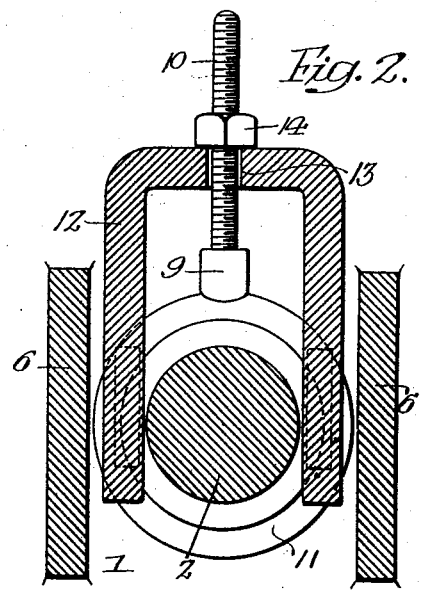
Figure 3:
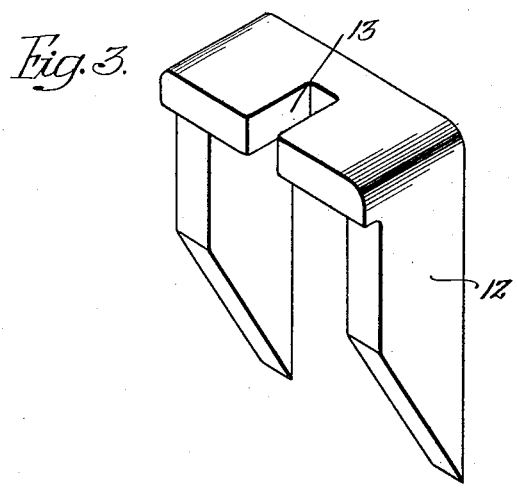
Figure 4:
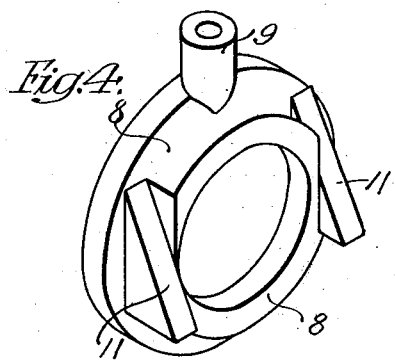

These objects and other advantageous ends I secure as hereinafter set forth, reference being had to the accompanying drawings in which, Figure 1 is a vertical section illustrating the detail construction of my invention; Fig. 2 is a vertical section on the line $a$—$a$, Fig. 1; and Figs. 3 and 4 are perspective views of certain of the parts of the stuffing box shown in the other figures.

In the above drawings, 1 represents a portion of the wall or side of a container or other structure through which passes a rotating shaft 2, there being preferably a bushing 3 mounted in said structure 1 for receiving the shaft. Connected in any desired manner to the container or structure 1 is a bearing 4 having a bushing 5 by which the shaft 2 is supported and said bearing is made yoke shaped so that the shaft passes between its two supporting arms or extensions 6. The outer face of the bushing 5 is preferably made smooth or is finished and immediately adjacent it I mount upon the shaft 2 an annular body 7 of packing, holding this in place by means of a ring shaped structure 8 forming a gland, made concave on the side immediately adjacent the packing so as to receive one end or edge thereof. This structure 8 makes a neat running fit on the shaft and has an upwardly projecting lug 9 to which is fixed a stud or screw 10. Its rear face is also provided with two wedge shaped projections 11 having inclined surfaces designed to coöperate with similarly inclined surfaces belonging to the arm of a U shaped structure 12 fitting between them and the bearing 4. The upper part of this structure 12 is slotted at 13 for the reception of the screw 10 which loosely passes through it and is held in any adjusted position by a nut 14. With this arrangement of parts, the screwing down of the nut 14 pushes down the wedge shaped ends of the structure 12 and through the projections 11 forces the annular gland structure 8 toward the packing 7. This latter is thereby forced against the bushing 3 in such a manner as to form a fluid-tight joint between it and the shaft 2, it being understood that the said bushing makes a tight joint with the structure in which it is mounted.

As the shaft wears in the bushing 5 of the bearing 4 or in the bushing 3 so as to move downwardly or laterally, the annular structure 8 naturally follows it as does also the packing 7 which is free to move over the finished face of the bushing 3. A fluid-tight joint is thus maintained between the shaft and said bushing and as the packing wears it may be taken up by so turning the nut 14 as to force downwardly the wedge shaped ends of the U shaped piece 12. The packing thus floats with the shaft and satisfactorily performs its function even though said shaft varies its position very considerably relatively to the bearing and the bushing.

It is obvious that as the shaft moves downwardly on account of the wear, the annular structure 8 moves with it as does also the U shaped structure 12, the same being true in case said shaft moves laterally, although in this instance the annular structure 8 will swing or tend to swing on the supporting structure 12.

I claim—

1. The combination in a stuffing box of a structure through which passes the shaft to be packed; a body of packing material surrounding the shaft and adjacent said structure; a gland on the shaft; an abutment; with a member mounted between the abutment and the gland and supporting the latter.

2. The combination of a wall structure having a bearing; a shaft passing through said structure and the bearing; a body of packing surrounding the shaft in position to prevent leakage of fluid through the structure around the shaft; and a floating device mounted on the shaft and maintaining the packing in operative position.

3. The combination of a structure having a yoke shaped portion providing a bearing; a shaft passing through the structure and said bearing; a body of packing surrounding the shaft in position to prevent leakage from the structure around the shaft; a gland mounted on the shaft; and a movable structure mounted between the gland and the bearing; with means connected to said gland for maintaining the packing in operative position.

4. The combination of a structure having an opening; a shaft passing through said opening; an abutment; a body of packing around the shaft adjacent the structure through which it passes; a gland for the packing having inclined surfaces; with a member mounted between the gland and the abutment, and having inclined surfaces coöperating with those of said gland.

5. The combination of a structure having an opening; a shaft passing through said opening; an abutment; a body of packing around the shaft adjacent the structure through which it passes; a gland for the packing having inclined surfaces; a member mounted between the gland and the abutment and having inclined surfaces coöperating with those of said gland; with means connecting the gland and said member for forcing the gland toward the packing.

6. The combination of a structure having an opening and provided with a bearing; a shaft passing through said opening and the bearing; a body of packing surrounding the shaft in position to prevent leakage between it and the structure through which it passes; a gland mounted on the shaft and provided with two inclined portions; a substantially U shaped structure having its ends inclined to coact with the inclined portions of the gland and mounted between the latter and the bearing; with a threaded member adjustably connecting the gland and the U shaped structure for forcing said gland against the packing.

In testimony whereof, I have signed my name to this specification, in the presence of two subscribing witnesses.

WALTER DE HUFF.

Witnesses:
HARRY MOYER,
DAVID S. MEISENHELDER.

---

Copies of this patent may be obtained for five cents each, by addressing the "Commissioner of Patents, Washington, D. C."